United States Patent [19]

Gage

[11] Patent Number: 4,471,557
[45] Date of Patent: Sep. 18, 1984

[54] PROCESS FOR MAKING SPOON TYPE FISHING LURES AND THE PRODUCT THEREOF

[76] Inventor: Raymond T. Gage, 27110 Clairview Dr., Dearborn Heights, Mich. 48127

[21] Appl. No.: 343,494

[22] Filed: Jan. 28, 1982

[51] Int. Cl.³ .............................................. A01K 85/01
[52] U.S. Cl. .................................. 43/42.31; 43/42.5; 43/42.53
[58] Field of Search .................. 43/42.52, 42.53, 42.5, 43/42.51, 42.32, 42.31; D22/29

[56] References Cited

U.S. PATENT DOCUMENTS

| | | | |
|---|---|---|---|
| D. 138,088 | 6/1944 | Moblo et al. | 43/42.5 X |
| D. 191,614 | 10/1961 | Elrod | 43/42.51 X |
| D. 203,997 | 3/1966 | Wells | 22/29 |
| 524,494 | 8/1894 | Thayer | 43/42.52 X |
| 1,444,338 | 2/1923 | Doering | 43/42.32 |
| 2,043,244 | 6/1936 | Hauffman et al. | 43/42.52 |
| 2,497,807 | 2/1950 | Wood | |
| 2,741,058 | 4/1956 | Allman | 43/42.53 X |
| 2,791,057 | 5/1957 | Memoli | |
| 2,923,083 | 2/1960 | Bailer | |
| 3,403,469 | 10/1968 | Whitney | 43/42.5 X |
| 3,432,957 | 3/1964 | Marino | 43/42.31 X |
| 3,656,253 | 4/1972 | Gaunt | 43/42.51 X |
| 3,762,088 | 10/1973 | Bainton | |
| 3,919,802 | 11/1975 | Davis | |

Primary Examiner—Nicholas P. Godici
Assistant Examiner—P. Weston Musselman, Jr.
Attorney, Agent, or Firm—Alex Rhodes

[57] ABSTRACT

A process for making foil type fishing lures and the product thereof. The process provides a low cost method of making a variety of lures from a common blank, each having accuracy and balance with unique features and actions. A blank is first cut from a sheet of metal and a surface finish thereafter is applied to the blank. The overall shape of the blank is a truncated oval with a rounded leading portion and a segmented truncated trailing portion. Within the segmented trailing portion is a slot which divides the blank into symmetrical half segments. A compound shape is next formed in the metal of the blank by a lateral displacement of the trailing segments which bows the metal. Displacement of the segments also closes the slot and reduces the surface area of the lure. The compound shape is then fixed by interconnecting the trailing segments at their displaced positions. The final step is the assembly of remaining hardware to the body of the lure.

21 Claims, 27 Drawing Figures

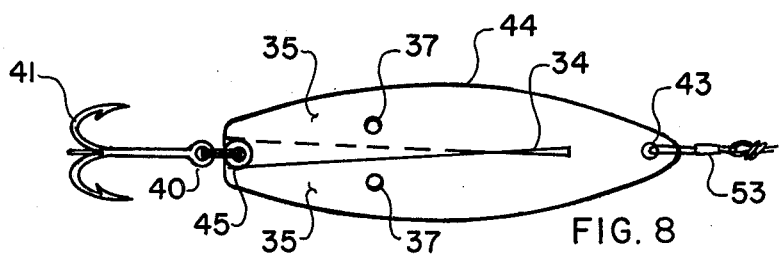
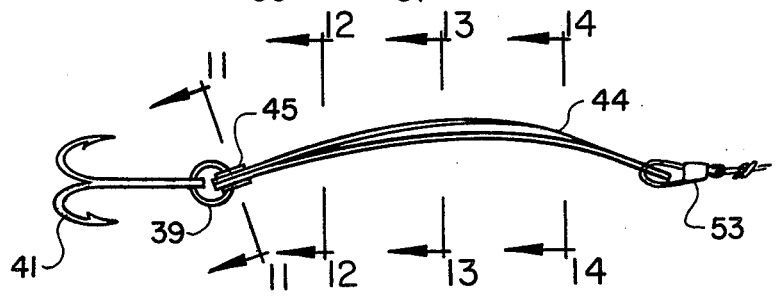
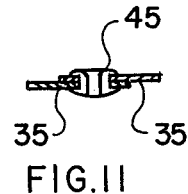
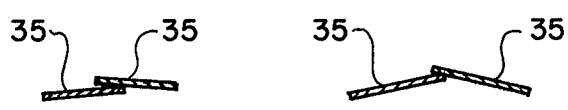
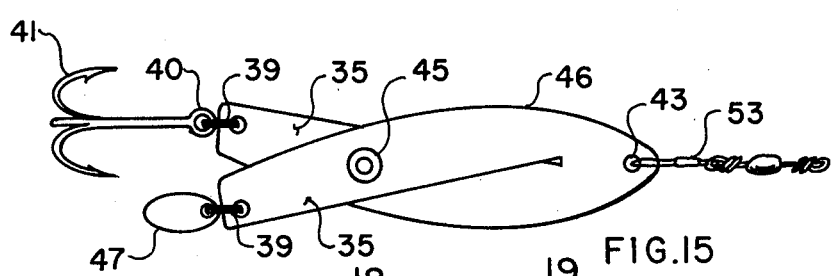
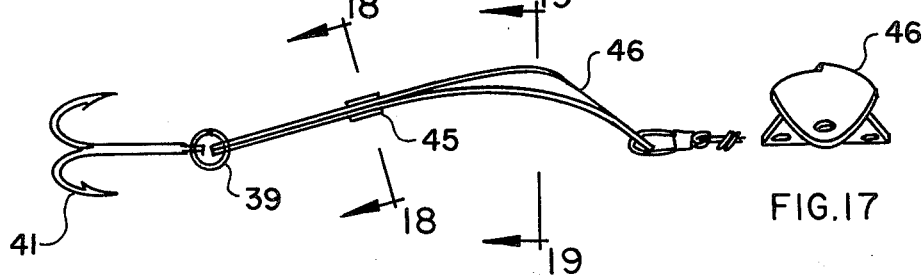
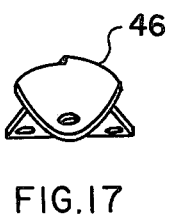

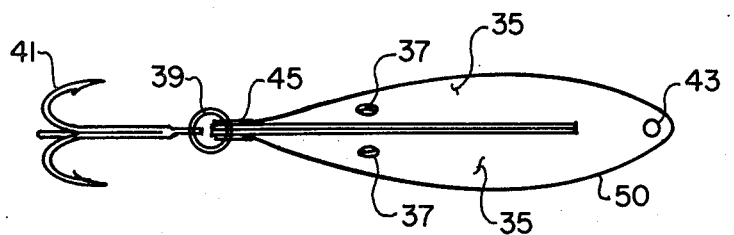
FIG. 20
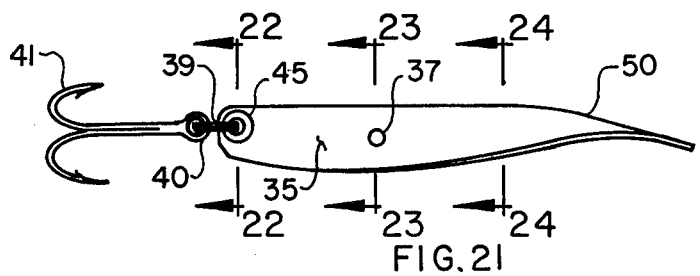 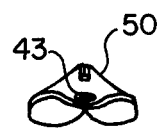
FIG. 21  FIG. 22
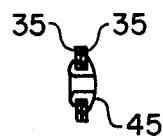 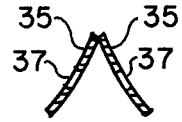 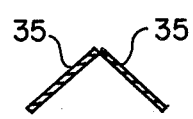
FIG. 23  FIG. 24  FIG. 25
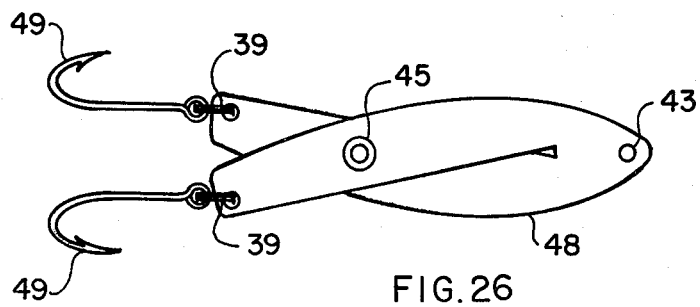
FIG. 26
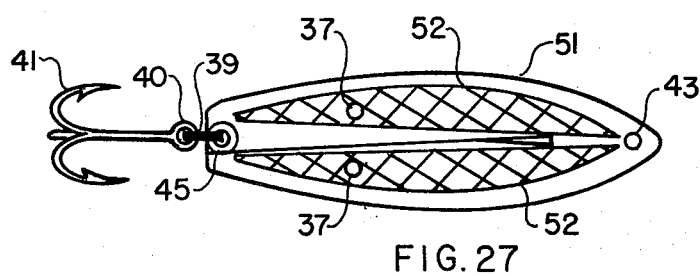
FIG. 27

PROCESS FOR MAKING SPOON TYPE FISHING LURES AND THE PRODUCT THEREOF

BACKGROUND OF THE INVENTION

Spoons and similar foil type lures are among the oldest types of artificial bait known in the art. They are believed to have originated when pioneer woodsmen and Indians discovered the virtues of attaching clamshells and culinary spoons to fishing lines for attracting fish. Their popularity has continued through generations of sport fishermen because of their effectiveness, resistance to snags, and compactness which permits a fisherman to store large numbers in his tackle box and avoid the frustration of running out of bait. It can be said without exaggeration, it is a rarity for a tackle box to not contain some spoon or other foil type lures.

Although foil type lures have long existed in the art, there has been little change in the process for making them since their first use. Heretofore, this type of lure has been made in quantity by shaping metal in expensive stamping dies and then applying an exterior finish and attaching hardware, such as, hooks and spinners. Although simple in construction, balance and precision are very important to foil type lures. Low cost lures have generally lacked the balance and action of the more expensive lures. The demands of fishermen for a variety of shapes and actions has caused high investments in expensive stamping dies which heretofore have been recovered in the price of the lures.

In view of the foregoing, it is apparent that a process for making foil type lures which reduces or eliminates the need for expensive forming dies and provides balance and precision would be desirable and advance the art.

It is a primary object of the present invention to provide a process for making spoon and other foil type lures which does not require stamping dies or other means of yielding metal for forming the compound shapes of the bodies of the lures.

It is a further object to provide a low cost process for providing balance and precision of spoon and other foil type lures.

It is a further object to provide a process for making spoon and other foil type lures whereby a variety of shapes and actions can be made from a common blank.

It is a further object to reduce the cost of making spoon and other foil type lures by reducing the investment in tools for making the lures.

It is a further object to provide a process which permits the application of the exterior finish to the material prior to forming the compound shapes of spoon and other foil type lures.

It is a further object to provide spoon and other foil type lures having improved performance and features over existing lures.

It is a further object to provide spoon and other foil type lures having random and erratic actions which are highly effective in the sport of fishing.

The foregoing objects, along with additional objects, features, advantages, and benefits of the invention, become more apparent in the ensuing description and accompanying drawings which disclose the invention in detail. A preferred embodiment is disclosed in accordance with the best mode presently contemplated in carrying out the invention. The subject matter in which an exclusive property is claimed is set forth in each of the numbered claims at the conclusion of the description.

SUMMARY OF THE INVENTION

The present invention is directed towards a process for making fishing lures and the product of the process. The process, which reduces the investment in expensive stamping dies, consists of the steps of cutting a segmented blank from a sheet of metal, optionally applying the surface finish to the blank, forming a compound shape in the metal by laterally displacing the segmented portions of the blank, fixing the compound shape in the metal by interconnecting the displaced segmented portions of the blank, and assembling the remaining hardware, such as, hooks and spinners to the body of the lure.

The compound shape of the lure primarily results from a bowing of the metal in two directions during the displacement of the segmented portions, rather than a yielding of metal beyond its elastic limit as is the case with the current method of shaping the metal in forming dies. Since the disclosed method eliminates the contact of the metal with the surfaces of stamping dies during forming of the compound shape, further savings become possible by applying the exterior finish to the flat blank or the use of pre-painted stock. Alternatively, the exterior finish can be applied to the surface of the lure after forming the compound shape of the lure.

Because the compound shape of the body of the lure results from a lateral displacement of the segmented portions, different degrees of curvature and shape can be achieved by varying the amount of lateral displacement. Also, the segments may be simultaneously overlapped or folded during the lateral displacement of the segments. Thus, a variety of shapes can be achieved from a common blank with simple inexpensive tooling. Additional effects caused by varying the amount of displacement which effect the action of the lure are changes in surface area and apertures from which wakes and sound waves emanate during the movement of the lure. The process also provides a means for achieving the accuracy and balance required for spoon and other foil type lures.

BRIEF DESCRIPTION OF THE DRAWINGS

FIG. 8 is a plan view of a second embodiment of the lure constructed in accordance with the present invention.

FIG. 9 is a right end elevational view of the lure shown in FIG. 8.

FIG. 10 is a front elevational view of the lure shown in FIG. 8.

FIG. 11 is a cross-sectional view taken along the line 11—11 of FIG. 10.

FIG. 12 is a cross-sectional view taken along the line 12—12 of FIG. 10.

FIG. 13 is a cross-sectional view taken along the line 13—13 of FIG. 10.

FIG. 14 is a cross-sectional view taken along the line 14—14 of FIG. 10.

FIG. 15 is a plan view of a third embodiment of the lure constructed in accordance with the present invention.

FIG. 16 is a front elevational view of the lure shown in FIG. 15.

FIG. 17 is a right end elevational view of the lure shown in FIG. 15.

FIG. 18 is a cross-sectional view taken along the line 18—18 of FIG. 16.

FIG. 19 is a cross-sectional view taken along the line 19—19 of FIG. 16.

FIG. 20 is a plan view of a fourth embodiment of the lure constructed in accordance with the present invention.

FIG. 21 is a front elevational view of the lure shown in FIG. 20.

FIG. 22 is a right end elevational view of the lure shown in FIG. 20.

FIG. 23 is a cross-sectional view taken along the line 23—23 of FIG. 21.

FIG. 24 is a cross-sectional view taken along the line 24—24 of FIG. 21.

FIG. 25 is a cross-sectional view taken along the line 25—25 of FIG. 24.

FIG. 26 is a plan view of a lure having the same construction as the lure of FIG. 15 except for the substitutions of the auxiliary spoon and treble hook by a pair of single hooks.

FIG. 27 is a plan view of a lure having the same construction as the lure of FIG. 8 and an applique on the top surface of the lure.

DESCRIPTION OF THE PREFERRED EMBODIMENT

Figure 1:
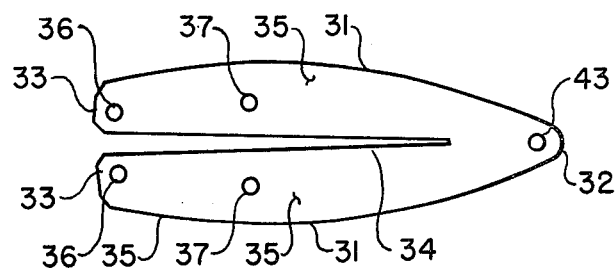
FIG. 1 is a plan view of a blank which is common to the lures illustrated in the drawings and constructed in accordance with the present invention.
Figure 2:
FIG. 2 is a right end elevational view of the blank shown in FIG. 1.

Referring now to the drawings, wherein like numerals designate like and corresponding parts throughout the several views, the initial step in my process for making fishing lures is the cutting of the blank 30 illustrated in FIG. 1 from a sheet of metal. The shape of the blank 30 illustrated in FIG. 1 is exemplary of the process and the product thereof and can be varied somewhat to satisfy the needs and desires of the market without departing from the concept of the invention.

The overall shape of the blank 30 is a truncated oval. Arcuate sides 31 of the oval converge in the forward direction to a rounded leading edge 32 and in the opposite direction to a truncated trailing edge 33. The means for cutting the blank 30 are conventional, preferably a stamping die for large quantities, and possibly a hand tool, such as, metal snips or nibblers for smaller quantities.

An important feature of the blank is the tapered slot 34 which begins at the trailing edge 33 and narrows as it extends along the center of the blank 30 for about three quarters the length, dividing the blank 30 into two segmented portions 35. It will become apparent that the length of the slot 34 can be adjusted to vary the final shape of the lure. Within the interior of the blank 30 are several apertures. One aperture 43, used for attaching a line 42, is positioned on center immediately aft of the leading edge 32. The remaining apertures are arranged in pairs. One pair of apertures 36 is in the trailing portion of the blank 30 while the other pair 37 is at an intermediate position. The spacing of each aperture of the pairs 36, 37 is symmetrical in a lateral direction from the tapered slot 34.

The next step in the process is the application of an exterior finish to the blank 30. The order of this step is optional with my process since the finish can be applied prior to the cutting the blank 30 or after forming the compound shape of the lure. Heretofore, it has not been advisable to apply the exterior finish before forming because of the likelihood of damaging the finish during forming with metal dies.

With regard to exterior finishes, it has been noted that fish respond to bright colors and reflective surfaces. For accomplishing this desirable effect, appliques have been added to the surfaces of lures. An advantage of my process is that finishes and appliques can be easily applied to the blank at any stage with minimum risk of damage during forming of the compound shape. By way of example, an applique 52 with an adhesive backing which was applied to the blank 30 is shown on the upper surface of each segment 35 of the lure 51 in FIG. 27.

After applying the finish, the blank 30 is ready for the step of forming the compound shape. With the existing process the shape is formed in stamping dies by stretching and deforming the metal beyond its elastic limit whereas with the present invention the compound shape is substantially formed by the lateral displacement of the segments 35 on opposite sides of the tapered slot 34 and bowing the metal. Thus, the shape is formed by bending rather than stretching and deforming as is the case with the current process. For fabricating experimental parts, the displacement of the segments 35 has been readily done by hand, however, for quantity production a fixure is preferred.

After forming the compound shape, the shape is fixed by interconnecting the segments 35 at their displaced positions. The final step of the process is the assembly of remaining hardware, such as, hooks and spinners. It will be observed that since the compound shape is the result of a lateral displacement of the segmented portions 35 of the blank 30, surface area and shape will vary with the amount of lateral displacement of the segments 35. Thus, a variety of lures can be made from a common blank by varying the displacement of the segments 35.

In the remaining drawings, several embodiments are shown of lures constructed from the blank 30 of FIG. 1 in accordance with the present invention. Each of these embodiments was pulled through the water and its motion observed.

Figure 3:
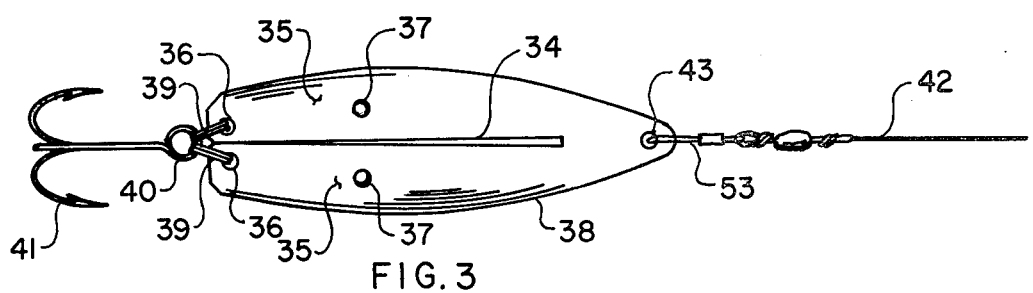
FIG. 3 is a plan view of a lure which is constructed in accordance with the present invention.
Figure 4:
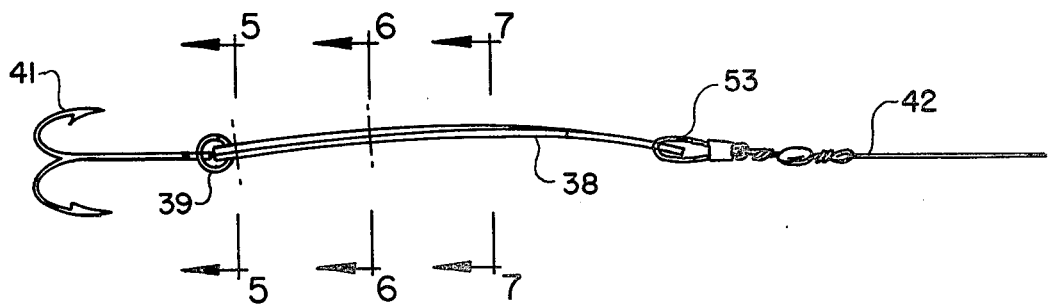
FIG. 4 is a front elevational view of the lure shown in FIG. 3.
Figure 5:
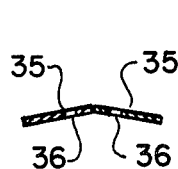
FIG. 5 is a cross-sectional view taken along the line 5—5 of FIG. 4.
Figure 6:
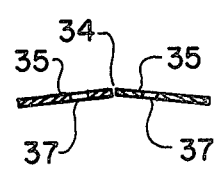
FIG. 6 is a cross-sectional view taken along the line 6—6 of FIG. 4.
Figure 7:
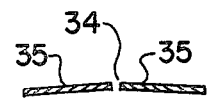
FIG. 7 is a cross-sectional view taken along the line 7—7 of FIG. 4.

Referring to FIG. 3, the first embodiment 38 is shown wherein the segments of the blank 30 are laterally displaced without overlapping of the segments 35. It will be noted that the slot 34 is substantially closed at the displaced positions of the segments 35. The shape of the lure 38 has been fixed by inserting the split wire rings 39 into the apertures at the trailing portion of the lure 38 and connecting the split rings 39 with the eye portion 40 of the treble hook 41. A fishing line 42 is releasably attached to the lure 38 by connecting the fitting 53 of the line to the forward aperture 43 of the lure 38. When pulled through the water during trolling or casting, the side to side motion of the lure 38 resembles the movements of a swimming fish.

Referring now to FIG. 8, a second embodiment 44 of the invention is shown wherein the curvature has been increased over the lure 38 of FIG. 3 by a greater lateral displacement and overlapping of the segments 35 of the blank 30. The curvature of the lure 44 has been fixed by inserting and clinching the eyelet 45 in the aligned trailing pair of apertures 36. The split wire ring 39 inserted into the eyelet 45 retains the treble hook 41. It will be observed that the shape, curvature and area of this embodiment 44 differ from the embodiment 38 of FIG. 3 because of the greater lateral displacement of the segments 35. When towed through the water this lure 44 moved in a random erratic pattern which varied from a flutter pattern to an erratic darting motion. This type of action which is believed to incite and confuse a fish was found to be extremely effective for catching large numbers of fish.

Referring to FIG. 15, the shape of the lure 46 has been further varied in the third embodiment 46 by displacing the segmented portions 35 additionally to align the intermediate apertures 36 of the displaced segments 35. In this configuration the trailing portions of the segments 35 have been displaced to extend beyond opposite sides of the lure 46 and the curvature further increased over the second embodiment 44 shown in FIG. 8.

The eyelet 45 engages the apertures 37 and fixes the shape of the lure. The split ring 39 engages the aperture 36 and attaches the treble hook 41. A second split ring 39 engages the aperture 36 of the other segment 35 and attaches a small auxiliary spoon 47. The embodiment 48 of FIG. 26 is a variation of this embodiment 46 wherein a pair of single hooks 49 replace the treble hook 41 and auxiliary spoon 47 of FIG. 15. When towed through the water the lure 46 of FIG. 15 moved with an inverted side to side motion similar to a swimming fish or frog.

Referring now to FIG. 20, the segmented portions 35 have been simultaneously displaced and folded to produce the fourth embodiment 50 of the invention. In this embodiment 50 the same surfaces of adjacent segments 35 have been juxtaposed and fixed by engagement of the eyelet 45 with the aligned apertures 36 of the segments 35. When towed through the water this lure 50 moved with a spiral action in a continuous rotation.

Although but several embodiments of the invention have been disclosed and described in detail, it is obvious that changes can be made in the size, shape and arrangement of the various elements thereof, all without departing from the spirit and scope of the invention as defined by the appended claims.

I claim:

1. A spoon type fishing lure comprising: a segmented foil type body having interconnected segments, said body made by first cutting a blank from a sheet of material, said blank having at least one slot extending from an outer edge to an inner portion thereof for dividing a portion of the blank into segments on opposite sides of the slot, thereafter bowing the blank in a single direction by laterally displacing the segments inwardly toward one another to substantially close said slot and form a substantially convex upper surface and concave lower surface of the spoon type lure, and thereafter interconnecting the segments to fix said shape; a means for interconnecting the segments; a means for attaching a line to the leading portion of the body; and at least one hook attached to the trailing portion of the body.

2. The fishing lure as recited in claim 1 wherein the profile of the body of said lure is an oval shape with a truncated trailing portion.

3. The fishing lure as recited in claim 1 wherein each segment on opposite sides of the slot has an aperture in the trailing portion thereof for receiving a split wire ring and the means for interconnecting the segments to fix the shape of the lure body comprises a pair of split wire rings and the eye portion of the hook, one of said rings engaging one of said apertures, the other of said rings engaging the other of said apertures and the eye portion of the hook engaging both of said rings.

4. The fishing lure as recited in claim 1 wherein the means for interconnecting the segments is an eyelet in engagement with an aperture in each of overlapping segments.

5. The fishing lure as recited in claim 1 wherein each of the segments has an applique with a bright reflective finish on the upper surfaces of said segments.

6. The fishing lure as recited in claim 1 wherein apertures are provided in the body whereby sounds and wakes are produced when said lure is towed through the water.

7. A spoon type fishing lure comprising: a segmented foil type body having a pair of interconnected overlapping segments, the upper surface of one segment in contact with and overlapping the lower surface of the other segment, said body made by first cutting a blank from a sheet of material, said blank having a slot extending from an outer edge to an inner portion thereof for dividing a portion of the blank into segments on opposite sides of the slot, thereafter bowing the blank in a single direction and overlapping the segments by laterally displacing the segments inwardly toward one another and bringing into contact the upper surface of one segment with the lower surface of the other segment to substantially close said slot and form a substantially convex upper surface and concave lower surface of the spoon type lure, and thereafter interconnecting the segments to fix said shape; a means for interconnecting the segments; a means for attaching a line to the leading portion of the body; and at least one hook attached to the trailing portion of the body.

8. A spoon type fishing lure comprising: a segmented foil type body having a pair of interconnected overlapping segments, the trailing portions of said segments extending beyond the opposite side portions of the body and the upper surface of one segment in contact with the lower surface of the other segment, said body made by first cutting a blank from a sheet of material, said blank having a slot extending from an outer edge to an inner portion thereof for dividing a portion of the blank into segments on opposite sides of the slot, thereafter bowing the blank in a single direction and overlapping the segments by laterally displacing the segments inwardly toward one another and bringing into contact the upper surface of one segment with the lower surface of the other segment to substantially close said slot and form the shape of the body of the spoon type lure, and thereafter interconnecting the segments to fix the shape; a means for interconnecting the segments; a means for attaching a line to the leading portion of the body; and a hook attached to the trailing portion of the body.

9. The fishing lure as recited in claim 8 wherein a hook is attached to each of the trailing portions of the body.

10. A spoon type fishing lure comprising: a segmented foil type body having a pair of interconnected abutting segments folded about an axis lying between the segments, the lower surface of one of the segments being aligned and in contact with the lower surface of the opposite segment, said body made by first cutting a blank from a sheet of material, said blank having a slot extending from an outer edge to an inner portion thereof for dividing a portion of the blank into segments on opposite sides of the slot, thereafter bowing the blank in a single direction and abutting the lower surfaces of the segments by laterally displacing the segments inwardly toward one another and folding the segments about an axis lying between the segments to substantially close said slot and form the folded shape of the spoon type lure including a bowed leading portion and a folded trailing portion, and thereafter interconnecting the segments to fix the shape; a means for interconnecting the segments; a means for attaching a line to the leading portion of the body; and a hook attached to the trailing portion of the body.

11. A spoon type fishing lure comprising: a segmented foil type body having a substantially oval profile with a truncated trailing portion; a pair of interconnected segments and an applique with a bright reflective finish on the upper surface of the body, said body having a shape made by bowing a segmented sheet material blank in a single direction, said bowing resulting from laterally displacing inwardly toward one another segments of the blank on opposite sides of a slot extending from an outer edge to an inner portion of the blank to substantially close said slot and form a substantially convex upper surface and concave lower surface of the spoon type lure, thereafter interconnecting the segments to fix the shape; a means for interconnecting the segments; a means for attaching a line to the leading portion of the body; and at least one hook attached to the trailing portion of the body.

12. A process for making a spoon type fishing lure comprising: the forming of the shape of the body of the lure by bowing a sheet material blank in a single direction, said bowing performed by laterally displacing inwardly toward one another segmented portions on opposite sides in a slot of said blank to substantially close said slot and thereby form the shape of the body of the spoon type lure; and thereafter interconnecting the displaced segmented portions to fix said shape.

13. A process for making a spoon type fishing lure comprising: the forming of the shape of the body of the lure by bowing a sheet material blank in a single direction, said bowing performed by laterally displacing inwardly toward one another segmented portions on opposite sides of a slot of said blank and overlapping upper and lower surfaces of said segmented portions to substantially close said slot and thereby form the shape of the body of the spoon type lure; and thereafter interconnecting the displaced segmented portions to fix said shape.

14. A process for making a spoon type fishing lure comprising: the forming of the shape of the body of the lure by bowing a sheet material blank in a single direction, said bowing performed by laterally displacing inwardly toward one another segmented portions on opposite sides of a slot of said blank and folding said segmented portions about an axis therebetween to place together the lower sides of the segments and substantially close said slot and thereby form the shape of the body of the spoon type lure; and thereafter interconnecting the displaced segmented portions to fix said shape.

15. A process for making a spoon type fishing lure comprising: cutting a segmented blank from a sheet of material for making the body of said lure; forming the shape of said body by bowing said blank in a single direction, said bowing performed by laterally displacing inwardly toward one another segmented portions on opposite sides of a slot of the blank to substantially close said slot and thereby form the shape of the body of the spoon type lure; interconnecting the displaced segmented portions to fix said shape; and attaching at least one hook to the trailing portion of the body of the lure.

16. The process as recited in claim 15 wherein an exterior finish is applied to the material after the cutting of said blank.

17. The process as recited in claim 15 wherein an exterior finish is applied to the material after the forming of the compound shape in the material of the blank.

18. The process as recited in claim 15 wherein an exterior finish is applied to the material prior to the cutting of the blank.

19. A process for making a spoon type fishing lure comprising: cutting a segmented blank from a sheet of material for making the body of the lure; forming the shape of said body by bowing said blank in a single direction, said bowing performed by laterally displacing inwardly toward one another segmented portions on opposite sides of a slot of the blank and overlapping upper and lower surfaces of said segmented portions of the blank to substantially close said slot and align apertures contained in the overlapped segmented portions; installing an eyelet in the aligned apertures; clinching the eyelet to fix said shape; and attaching at least one hook to the trailing portion of the body of the lure.

20. The process as recited in claim 19 wherein an exterior finish is applied to the material after the cutting of the blank.

21. The process as recited in claim 20 wherein the application of the exterior finish includes an applique on the top surface of each of the segmented portions.

* * * * *